United States Patent [19]
DeRudder et al.

[11] Patent Number: 5,196,245
[45] Date of Patent: Mar. 23, 1993

[54] IRRADIATION RESISTANT FUNCTIONALLY ENCAPPED POLYCARBONATE

[75] Inventors: James L. DeRudder, Mt. Vernon; Niles R. Rosenquist, Evansville, both of Ind.

[73] Assignee: General Electric Company, Pittsfield, Mass.

[21] Appl. No.: 677,940

[22] Filed: Apr. 1, 1991

[51] Int. Cl.$^5$ .................. B65B 55/08; A61L 2/08; C08L 69/00
[52] U.S. Cl. .................. 428/35.5; 206/524.1; 422/22; 525/439; 525/469; 528/204
[58] Field of Search .................. 422/22; 525/469, 439; 528/204; 428/35.5; 206/524.1

[56] References Cited

U.S. PATENT DOCUMENTS 4,778,656 10/1988 Allen .................. 422/22
4,933,424 6/1990 Rosenquist .................. 528/196

FOREIGN PATENT DOCUMENTS 499331 1/1954 Canada .................. 422/22
204754 9/1987 Japan .................. 422/22

Primary Examiner—David J. Buttner

[57] ABSTRACT

Thermoplastic articles molded from polycarbonate resin blends which comprise a polycarbonate resin encapped with a monovalent moiety of the formula:

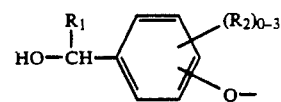

wherein $R_1$ is selected from hydrogen and hydrocarbyl and each $R_2$ is selected from hydrocarbyl and hydrocarbyloxy exhibit improved color when irradiated with ionizing radiation.

11 Claims, No Drawings

IRRADIATION RESISTANT FUNCTIONALLY ENCAPPED POLYCARBONATE

BACKGROUND OF THE INVENTION

1. Field of The Invention

The invention relates to irradiated articles molded from thermoplastic molding compositions and more particularly relates to articles molded from compositions of irradiation resistant aromatic polycarbonate resins and sterilized by ionizing radiation.

2. Brief Description of The Prior Art

Synthetic polymeric resins have been used increasingly to mold articles useful in medicine and surgery. Examples of such articles include containers, packaging, instruments, prosthetics, tubing, and working components of treatment apparatus. The selection of a particular polymeric resin will depend on the physical properties required in the molded article.

One property necessary to many medical and surgical articles molded from thermoplastic polymeric resins, is their receptivity to sterilization procedures. A commonly preferred sterilization technique is exposure to ionizing radiation. Unfortunately, ionizing radiation may adversely impact some polymeric resins in ways unacceptable to some uses.

For example, polycarbonate resins have many properties which are advantageous to their use in many medical and surgical devices or articles. However, upon exposure to ionizing radiation they generally change from a normally desired transparency and clarity to a yellowed coloration. In addition, this yellow color continuously changes with increasing time after gamma ray exposure. Aesthetically, the yellowed coloration and the continuously changing color are not always acceptable.

A number of compounds have been used as additives to polycarbonate resins, to inhibit the yellowing of articles molded from polycarbonates and subjected to ionizing radiation. Representative of these additives are those described in the U.S. Pat. Nos. 4,624,972 (Nace); 4,657,949 (Nace); 4,757,104 (Nace); 4,804,692 (Lundy et al.) and 4,880,850 (Nelson et al). However, the presence of any additive in a polycarbonate resin molding composition generally has an effect on other desirable physical properties.

Another strategy for reducing the yellowing of a polycarbonate resin upon exposure to ionizing radiation is described in the U.S. Pat. No. 4,778,656 (Allen et al, 1988). The method entails blending the polymer with another polymer, which has the effect of improving ionizing radiation resistance of the polycarbonate. Examples of the additive polymers are polyester, polysulfone-carbonates and certain copolyesters. Like the previously described yellowing inhibitors, these additive polymers also affect physical properties in articles molded from blends of the mixed polymers.

The U.S. Pat. No. 4,933,424 recently issued to one of us (Rosenquist) describes a class of hydroxy-terminated polycarbonate resins, among which we have found a group of resins which exhibit improved color after sterilization with ionizing radiation.

SUMMARY OF THE INVENTION

The invention comprises an article molded from a thermoplastic molding composition, which comprises; an aromatic polycarbonate resin endcapped with a monovalent moiety of the formula:

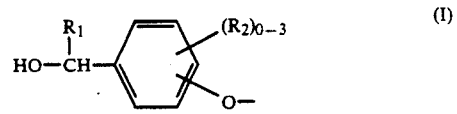

wherein $R_1$ is hydrogen or hydrocarbyl and each $R_2$ is independently selected from hydrocarbyl and hydrocarbyloxy;

said article having been subjected to sterilization by ionizing ray.

The term "sterile" and "sterilizing" as used throughout the specification and claims is not according to the classical definition formulated by the Council on Pharmacy and Chemistry of the American Medical Association, but rather means the absence (or killing) of undesirable microorganisms within the limits prescribed by the United States Pharmacopia XXII (1990). The methods of determining sterility and the specification for sterility may be in accordance with the U.S. Pharmacopia XXII; see (71) pages 1483-1488.

The term "ionizing-ray" as used throughout the specification and claims means ionizing radiation. The term "ionizing radiation" means radiation possessing an energy at least sufficient to produce ions or to break chemical bonds and thus includes radiations such as "ionizing particle radiation" as well as radiations of the type termed "ionizing electromagnetic radiation".

The term "ionizing particle radiation" is used to designate the emission of electrons or highly accelerated, relatively heavy, nuclear particles such as protons, neutrons, alpha particles, deuterons, beta particles, or their analogs directed in such a way that the particle is projected into the mass to be irradiated. Charged particles can be accelerated by the aid of voltage radiants by such devices as accelerators with resonance chambers, Van der Graaff generators, insulating core transformers, betatrons, synchrotrons, cyclotrons and the like. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic radiation" is produced when a metallic target such as tungsten is bombarded with electrons of suitable energy. This energy is conferred to the electrons by potential accelerators over 10,000 electron volts. In addition to radiations of this type, commonly called x-ray, an ionizing electromagnetic radiation suitable for the practice of this invention may be obtained by means of a nuclear reactor (pile) or by the use of natural or synthetic radioactive material, for example, cobalt 60. The use of cobalt 60 as a source of ionizing radiation, producing gamma rays, is preferred in the method of the present invention.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive, such a methyl, ethyl, propyl, butyl, pentyl, hexyl, heptyl, octyl, nonyl, undecyl, decyl, dodecyl, octadecyl, nonodecyl, eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like;

aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like; alkenyl of 2 to 25 carbon atoms, inclusive, such as vinyl, allyl, butenyl, pentenyl, hexenyl, octenyl, nonenyl, decenyl, undececyl, dodecenyl, tridecenyl, pentadecenyl, octadecenyl, pentacosynyl and isomeric forms thereof.

The term "hydrocarbyloxy" as used herein means the monovalent moiety of formula:

—O—hydrocarbyl wherein "hydrocarbyl" has the meaning given above to it.

The articles of the invention are useful for a wide variety of purposes such as, for example, sterile medical instruments and devices.

DETAILED DESCRIPTION OF THE PREFERRED EMBODIMENTS OF THE INVENTION

The formula (I) endcapped aromatic polycarbonate resins for use herein are well known as are methods of their preparation; see for example U.S. Pat. No. 4,933,424 (Rosenquist). In general, they may be prepared by reacting a dihydric phenol with a carbonate precursor, such as phosgene, a haloformate or a carbonate ester in the presence of a particular class of endcapping agent. Generally speaking, such carbonate polymers may be typified as possessing recurring structural units of the formula:

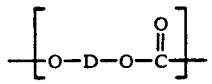

wherein D is a divalent aromatic radical of the dihydric phenol employed in the polymerization reaction. Preferably, the Formula (I) endcapped carbonate polymers have an intrinsic viscosity (as measured in methylene chloride at 25° C.) ranging from about 0.30 to about 1.40 dl/g. The dihydric phenols which may be employed to provide such endcapped aromatic carbonate polymers are mononuclear or polynuclear aromatic compounds, containing as functional groups two hydroxy radicals, each of which is attached directly to a carbon atom of an aromatic nucleus. The preferred polycarbonate resin is a homopolymer derived from 2,2-bis-(4-hydroxyphenyl) propane and a carbonate precursor.

The endcapped aromatic polycarbonates may be manufactured by known processes, such as by the methods set forth in U.S. Pat. Nos. 4,018,750 and 4,123,436 where a dihydric phenol is reacted with a carbonate precursor; or by transesterification processes such as are disclosed in U.S. Pat. No. 3,154,008, as well as other processes known to those skilled in the art.

In the conventional interfacial polymerization methods of preparing polycarbonates, a molecular weight regulator (a chain stopper) is generally added to the reaction mixture prior to or during the contacting with a carbonate precursor. Those same techniques are followed to prepare the endcapped polycarbonate resins used in the present invention, employing as the molecular weight controlling (endcapping) agent, a compound of the formula:

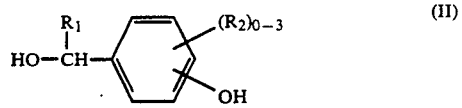

wherein $R_1$ and $R_2$ have the meanings previously ascribed to them.

Compounds of the formula (II) given above are generally well known as are methods of their preparation. Representative of such compounds are:
alpha-phenyl-4-hydroxybenzyl alcohol;
alpha-methyl-4-hydroxybenzyl alcohol;
2-hydroxymethylphenol;
3-hydroxymethylphenol;
4-hydroxymethylphenol
6-hydroxymethyl-2,4 dimethylphenol;
4-hydroxymethyl-2,6-dimethylphenol;
and the like.

Included within the term "polycarbonates", for the purposes of this invention are the poly (ester-carbonate) resins. These resins may generally be described as polymers comprising recurring

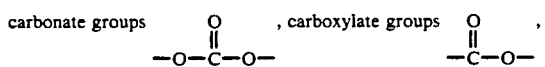

and aromatic carbocyclic groups in the linear polymer chain, in which at least some of the carboxylate groups and at least some of the carbonate groups are bonded directly to ring carbon atoms of the aromatic carbocyclic groups. These poly (ester-carbonate) polymers, in general, are prepared by reacting an aromatic difunctional carboxylic acid or ester forming derivative, a dihydric phenol and a carbonate precursor.

The preparation of poly (ester-carbonates) which may be employed in the compositions of the present invention is described in U.S. Pat. Nos. 3,030,331; 3,169,121; 3,207,814; 4,194,038 and 4,156,069 incorporated herein by reference.

The poly (ester-carbonates) which are preferred in the practice of the present invention include the aromatic poly (ester-carbonates) derived from dihydric phenols, aromatic dicarboxylic acids or their reactive ester forming derivatives such as the aromatic diacid halides, and phosgene. A particularly useful class of aromatic poly (ester-carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(estercarbonate) is generally from about 25 to 90 mole percent and preferably about 35 to 80 mole percent. The molar range of terephthalate units, with the remainder of the copolymer ester units preferably comprising isophthalate units, is generally from about 2 to about 90 percent, and preferably from about 5 to about 50 percent.

Typical dihydric phenols useful in formulating the polycarbonate resins, as described above, may be represented by the general formula:

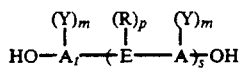

in which A is an aromatic group such as phenylene, biphenylene, naphthylene or anthrylene. E may be an alkylene or alkylidene group such as isopropylidene, butylene, butylidene, isobutylidene, amylene, isoamylene, amylidene, isoamylidene, and generally has from one to twelve carbon atoms, inclusive. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, or by a sulfur-containing linkage such as sulfide, sulfoxide and sulfone. In addition, E may be a cycloaliphatic group of five to twelve carbon atoms, inclusive (e.g. cyclopentyl, cyclohexyl), or a cycloalkylidene of five to twelve carbon atoms, inclusive, such as cyclohexylidene; a sulfur-containing linkage, such as sulfide, sulfoxide or sulfone; an ether linkage; a carbonyl group; a direct bond; or a tertiary nitrogen group. Other groups which E may represent will occur to those skilled in the art. R is hydrogen or a monovalent hydrocarbon group such as alkyl of one to eight carbon atoms, inclusive (methyl, ethyl, propyl); aryl (phenyl, naphthyl); aralkyl (benzyl, ethylphenyl); or cycloaliphatic of five to twelve carbon atoms, inclusive (cyclopentyl, cyclohexyl). Y may be an inorganic atom such as chlorine, bromine, fluorine; an inorganic group such as the nitro group; an organic group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one; and s is any whole number from and including zero to twenty.

In the typical dihydric phenol compound represented by Formula above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:
2,2-bis-(4-hydroxyphenyl)propane (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxyphenyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl)propane;
2,2-bis-(4-hydroxyphenyl)-1-phenylpropane; and the like. Also included are dihydroxybenzenes typified by hydroquinone and resorcinol; dihydroxydiphenyls such as 4,4'-dihydroxybiphenyl; 2,2'dihydroxybiphenyl; 2,4'-dihydroxybiphenyl; dihydroxynaphthalenes such as 2,6-dihydroxynaphthalene, etc. Also useful are dihydric phenols wherein E is a sulfur-containing radical such as the dihydroxy aryl sulfones exemplified by: bis-(4-hydroxyphenyl)sulfone; 2,4'-dihydroxydiphenyl sulfone; bis-(3,5-dimethyl-4-hydroxyphenyl)sulfone; 5'-chloro-2,4'-dihydroxydiphenyl sulfone; 4,4'dihydroxytriphenyldisulfone; etc. The preparation of these and other useful sulfones are described in U.S. Pat. No. 2,288,282. Hydroxy terminated polysulfones as well as substituted sulfones using halogen, nitrogen and alkyl radicals are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4,4'-dihydroxydiphenyl ether;
the 4,3'-, 4,2'-, 4,1'-,
2,2'-,2,3'-dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl-2,2'-ether;
4,4'-dihydroxy-2,6-dimethoxydiphenyl ether; and
4,4-dihydroxy-2,5-diethoxydiphenyl ether.

Mixtures of the dihydric phenols can also be employed, and where dihydric phenol is mentioned herein, mixtures of such materials are considered to be included. Other dihydric phenols which are suitable are disclosed in U.S. Pat. Nos. 2,999,835; 3,028,365; 3,334,154; 4,131,575.

The carbonate precursor used to produce the polycarbonate resins may be either a carbonyl halide, a carbonate ester, or a haloformate. The carbonyl halides which can be employed are carbonyl bromides. Typical of the carbonate esters are diphenyl carbonate, di(halophenyl)carbonates such as di(chlorophenyl)carbonate, di(bromophenyl)carbonate, di(trichlorophenyl)carbonate, di(tribromophenyl)carbonate, di(alkylphenyl)carbonate such as di(tolyl) carbonate, phenyltolyl carbonate, chloronaphthyl chlorophenyl carbonate, and the like. The haloformates suitable for use herein include bishaloformates of dihydric phenols such as bischloroformates of hydroquinone or glycols such as bis-haloformates of ethylene glycol, neopentyl glycol, and polyethylene glycol. While other carbonate precursors will occur to those skilled in the art, carbonyl chloride, also know as phosgene, is preferred.

The aromatic difunctional carboxylic acids suitable for producing poly (ester-carbonates) may be represented by the general formula:

wherein Z represents an aromatic radical such as phenylene, naphthylene, biphenylene, substituted phenylene; two or more aromatic groups connected through non-aromatic linkages such as those defined by E in the Formula for a dihydric phenol given above; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by the Formula I above, Z is an aromatic radical such as phenylene, biphenylene, naphthylene, substituted phenylene, etc. Some non-limiting examples of suitable aromatic dicarboxylic acids which may be used in preparing the poly(ester-carbonate) of the instant invention include phthalic acid, isophthalic acid, terephthalic acid, homophthalic acid, o-, m-, and p-phenylenediacetic acid, and the polynuclear aromatic acids such as diphenyl dicarboxylic acids and isomeric naphthalene dicarboxylic acids. Of course, these acids may be used individually or as mixtures of two or more different acids.

The end-capped resins described above are of course obtained in admixture with resin chains which are not end-capped (a crude reaction mixture). The crude mixtures are useful per se or they may be blended with other resins.

Blends of polycarbonate resins endcapped with the moiety of formula (I) given above with other known polycarbonate resins are generally useful and obtainable in all proportions relative to each other. Consequently, articles molded from blends having a weight ratio of the presently described endcapped polycarbonate to other polycarbonate resins in the range of 1:99 to 99:1 are within the scope of this invention. By controlling the proportions of the polycarbonates relative to each other, articles having certain properties may be readily obtained which resist irradiation.

The molding compositions of the invention may contain other components such as stabilizers, flame retardants, mold release agents, impact modifiers, foaming agents, pigments, and other thermoplastic resins such as polyesters, polyphenylene ethers, polyimides and the like.

The compositions of the invention may also contain fillers and reinforcing fibers such as, for example, glass and carbon. The fillers may include, for example, silica, talc, clay, mica, calcium sulfate and calcium carbonate. The amount of such additives present is dependent upon the desired effect and it is within the knowledge of those skilled in the art to determine the appropriate amounts.

Preparation of the resin blends used to mold articles of this invention may be accomplished by any conventional blending technique such as, for example, dry blending, melt blending, solution blending and the like. Melt blending may be accomplished in a conventional extruder, from which the admixture may be molded into a part of specific dimensions or further extruded to a film or sheet product.

The blends may be used to mold articles by any conventional thermoforming technique such as by injection molding.

The initially provided molded articles are generally provided hermetically sealed in a moisture-proof, microorganism-impermeable, ionizing ray-permeable container. Preferably, the articles are sealed in pouches, multiple containers such as overwraps or similar containers made of non-metallic materials which will effectively exclude infiltration of microorganisms, gas, vapor and moisture over a time period of several years. Such packaging materials are commercially available in numerous forms of polymeric films, including laminates of 2 or more films. For example, the pouches may be constructed of polyethylene, polypropylene, polyethyleneterephthalate, polyvinyl chloride and like polymeric films for forming hermetically sealed pouches. It will be appreciated that the containers should be initially provided in clean, particulate free condition and they may be pre-sterilized to some extent employing conventional techniques such as ultra-violet radiation and the like.

After the molded articles are sealed in the above-described containers, they are subjected, according to the method of the invention, to a sterilizing dose of an ionizing ray as defined above.

We have found that a non-degrading, sterilizing dose of ionizing radiation for the articles of the invention is advantageously within the range of from about 0.5 to 6.0 megarads; preferably not more than 4.0. Radiation within this dosage range may be carried out at room temperature or below or at elevated temperatures if so desired. The temperature at which radiation is carried out is not critical to the method of the invention. However, practical temperatures are within the range of from about minus 10° to about 50° C. Lower radiation dosages may not be effective in sterilizing the sealed in articles. Higher doses will generally degrade (destroy) either the package container or the article contained therein or both. This, of course, is undesirable. For this reason, preferably the dosage employed for sterilizing the sealed articles is within the range of from about 1 to about 3 megarads, most preferably circa 2.5 megarads.

Irradiation as described above may also be carried out advantageously in the absence of oxidizing agents, i.e.; in an atmosphere having an oxygen concentration which is reduced to such a degree that the quantity of oxygen molecules present is not sufficient to react during irradiation with the articles and their packaging materials. The reduction of the oxygen presence can be obtained by packaging the articles under and in the presence of an inert gaseous atmosphere such as nitrogen by the use of partial vacuum packing. The irradiation in the presence of nitrogen rather than oxygen atmosphere reduces the secondary or "indirect" destructive effects or radicals generated in the presence of oxygen. There is only a "direct" effect of direct bombardment by the ionizing rays.

As mentioned above, gamma radiation produced by cobalt 60 is a preferred ionizing ray for employment in the method of the invention. Gamma radiation produced by cobalt 60 has a high penetrating ability and obviates the need for concern about the thickness of the article to be penetrated.

It is well-known that microorganisms exposed to radiation, including gamma radiation, do not always die immediately. In some bacteria, which have been subjected to a radiation dose which prevents their multiplication, many biological functions continue for extended periods of time. For this reason, sterility testing to be carried out as a control mechanism should be delayed for a period of about four days following radiation.

Apparatus for producing ionizing rays and techniques of their application to a wide variety of materials are so well-known that further description need not be given herein. Those skilled in the art will appreciate the techniques of ionizing ray application.

What is claimed is:

1. An article molded from a thermoplastic molding composition, which comprises; a blend of
   A. from 1 to 99 parts by weight of an aromatic polycarbonate resin endcapped with a monovalent moiety of the formula:

wherein $R_1$ is selected from hydrogen and hydrocarbyl and each $R_2$ is independently selected from hydrocarbyl or hydrocarbyloxy; and
   B. from 99 to 1 parts by weight of a polycarbonate resin not endcapped with said monovalent moiety; said article having been subjected to sterilization by ionizing ray.

2. An article of claim 1 wherein the polycarbonate resin endcapped with a monovalent moiety contains structural units of the formula:

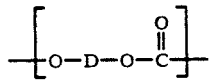

wherein D is divalent aromatic radical.

3. An article of claim 2 wherein aromatic polycarbonate resin endcapped with a monovalent moiety comprises of poly(ester-carbonate) polymers.

4. An article of claim 2 wherein the aromatic polycarbonate endcapped with a monovalent moiety is obtained by polymerizing phosgene with 2,2-bis(4-hydroxyphenyl) propane.

5. An article of claim 4 wherein the aromatic polycarbonate endcapped with a monovalent moiety is obtained by polymerizing phosgene with 2,2-bis(4-hydroxyphenyl) propane and a mixture of isophthaloyl and terephthaloyl dichlorides.

6. A method of preparing a thermally molded, sterile, article of improved color, which comprises;
   A. forming a blend of from 1 to 99 parts by weight of an aromatic polycarbonate resin endcapped with a monovalent moiety of the formula:

wherein $R_1$ is selected from hydrogen and hydrocarbyl and each $R_2$ is independently selected from hydrocarbyl or hydrocarbyloxy; and
   from 99 to 1 parts by weight of a polycarbonate resin not endcapped with said monovalent moiety
   B. thermoplastically molding
   the article in a solid form from said blend;
   sealing the article in a moisture-proof, microorganism-impermeable, ionizing ray-permeable container; and
   subjecting the sealed-in article to a non-destructive, sterilizing dose of an ionizing ray.

7. The article produced by the method of claim 6.

8. An article of claim 1 wherein the proportion of polycarbonate endcapped with the monovalent moiety is from 2.5 to 50 parts by weight.

9. An article of claim 1 wherein $R_1$ and $R_2$ are each methyl and there are two $R_2$ groups.

10. The method of claim 6 wherein the proportion of polycarbonate endcapped with the monovalent moiety is from 2.5 to 50 parts by weight.

11. The method of claim 6 wherein $R_1$ and $R_2$ are each methyl and there are two $R_2$ groups.

* * * * *